United States Patent [19]

Gilmour

[11] Patent Number: 4,912,685

[45] Date of Patent: Mar. 27, 1990

[54] SIDE LOOKING SONAR APPARATUS

[75] Inventor: George A. Gilmour, Severna Park, Md.

[73] Assignee: Westinghouse Electric Corp., Pittsburgh, Pa.

[21] Appl. No.: 278,069

[22] Filed: Nov. 30, 1988

[51] Int. Cl.$^4$ ................................................ G01S 9/66
[52] U.S. Cl. ......................................... 367/88; 342/25
[58] Field of Search ............................ 367/88; 342/25

[56] References Cited

U.S. PATENT DOCUMENTS

| | | |
|---|---|---|
| 3,585,579 | 6/1971 | Dorr et al. |
| 3,742,436 | 6/1973 | Jones |
| 3,950,723 | 4/1976 | Gilmour |
| 3,967,234 | 6/1976 | Jones |
| 4,024,490 | 5/1977 | Wood |
| 4,199,746 | 4/1980 | Jones et al. |
| 4,802,148 | 1/1989 | Gilmour ................................ 367/88 |

Primary Examiner—Thomas H. Tarcza
Assistant Examiner—Tod Swann
Attorney, Agent, or Firm—D. Schron

[57] ABSTRACT

A focused arc transducer which lies on an arc of a circle having a radius of curvature R is used as the transmitting transducer in a side looking sonar system. The arc lies in a plane which is tilted slightly with respect to a vertical orientation and the apparatus as utilized at an altitude H above a target area wherein H in one embodiment is greater than the radius of curvature and in another embodiment where it is less than the radius of curvature. This operation results in a desired trapezoidal insonification pattern on the target area with the pattern at maximum range being a little wider than the collective width of a plurality of receiver beams for a multibeam system.

7 Claims, 12 Drawing Sheets

SIDE LOOKING SONAR APPARATUS

BACKGROUND OF THE INVENTION

1. Field of the Invention

The invention in general relates to side looking sonar equipment and particularly to a transmitting transducer therefore.

2. Background Information

In side looking systems, the sonar apparatus is mounted on a carrier vehicle which travels along a course line at a certain altitude above the target area to be examined. A transmitting transducer propagates acoustic energy to ether side of the course line and impinges upon the target area in a relatively narrow strip, such impingement process being termed insonification. A receiver transducer receives the acoustic energy reflected from the insonfied strip and during the course of travel of the carrier vehicle, the return signals are portrayed on a line-by-line basis that is a pattern of highlights and shadows analogous to an optically viewed panorama illuminated by side lighting, with objects outlined in such a way as to permit their identification.

The carrier speed and therefore the search or mapping rate may be significantly increased by increasing the area detected and portrayed for each acoustic transmission. This is accomplished with the use of signal processing apparatus which forms a plurality of receiver beams each of which looks at a relatively narrow strip of the insonified region.

In one operating system, eight receiver beams are formed on either side of the carrier vehicle and relatively good resolution is obtained for target identification. The insonified region for the eight beam system is approximately the width of the eight beams at some minimum range of interest and slightly increases in width out to some maximum range of interest so as to define a trapezoidal pattern. This width difference is desired in order to accommodate for small variations in carrier speed as well as any oscillatory motion of the carrier vehicle about a vertical axis (yawing).

For extremely high resolution work, a system is utilized which travels at slower speeds and forms fewer and much more narrow receiver beams. A typical high resolution system may form three receiver beams and in such instance the transmitting transducer utilized in the eight beam system cannot be used for the three beam system because the insonification pattern would be too wide. Smaller transmitter transducers often used for the high resolution system cannot accommodate the power input required for the desired insonification and often experience cracking and total failure.

The side looking sonar apparatus of the present invention may be used for high resolution work and includes a transmitter transducer which can accommodate a high power input signal to properly insonify the target area.

SUMMARY OF THE INVENTION

The side looking sonar apparatus described herein includes an elongated transmitter transducer which lies along an arc of a circle having a radius R. The arc lies in a plane which is at a certain angle $\theta$ with respect to vertical during operation, where $\theta$ is no more than 6° and preferably in the order of one or two degrees. The transmitter transducer is operated at an altitude H above the target area. For practicing the invention, H and R must be of different values. Means are provided for energizing the transmitter transducer to periodically project acoustic energy toward the target area.

DESCRIPTION OF THE PREFERRED EMBODIMENTS

Figure 1:
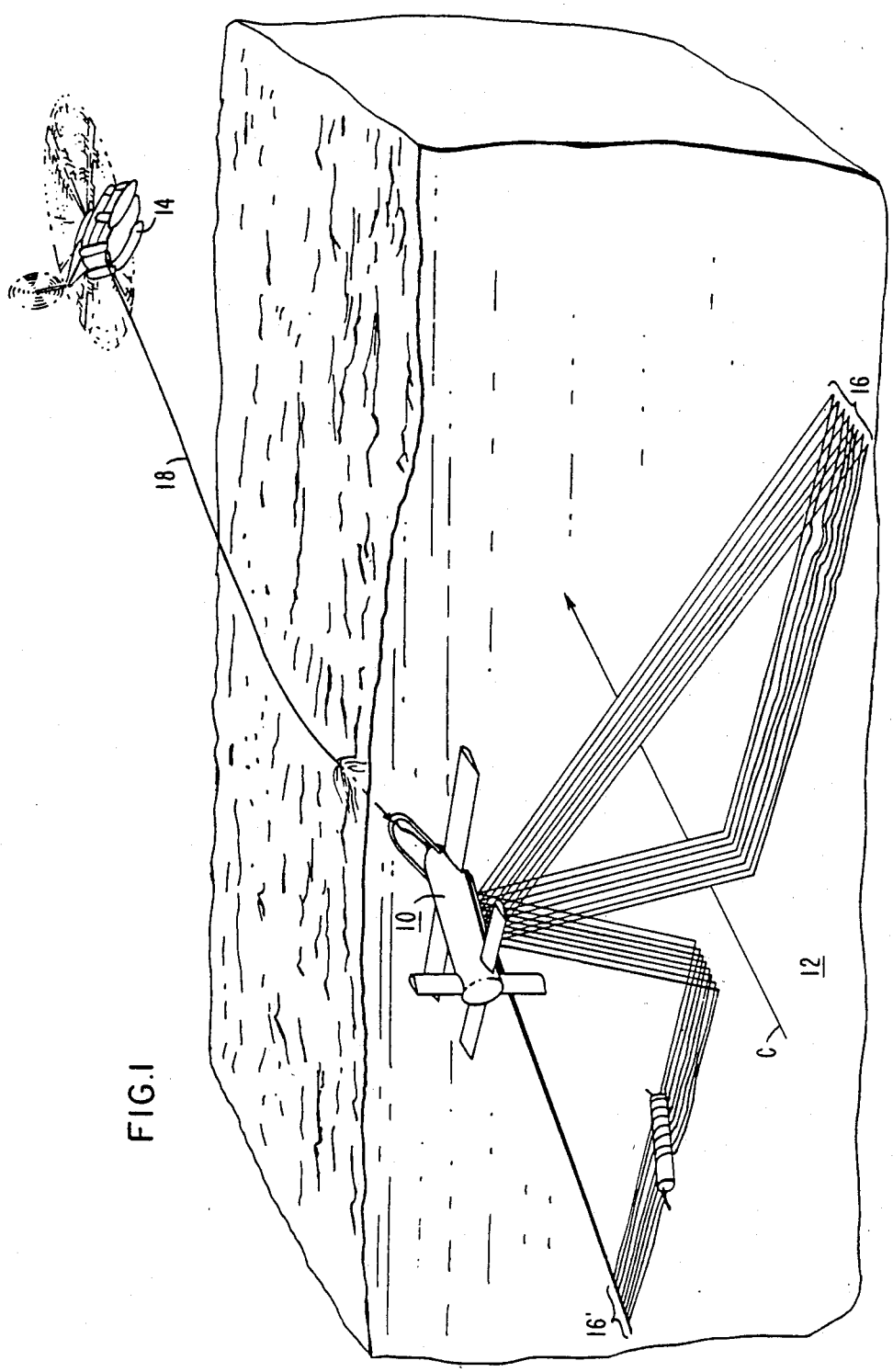
FIG. 1 illustrates a towed carrier multibeam side looking sonar system.

Referring now to FIG. 1, there is illustrated a multibeam side looking sonar system carried by an underwater vehicle 10 which is towed along a course line over a target area 12, such as the sea bottom, by means of a tow vehicle. In figure the tow vehicle is illustrated as a helicopter 14 although surface and subsurface vessels may also be utilized. The apparatus is towed at a certain altitude above the target area 12 and the projection of the line of travel, on the bottom is labeled C.

During travel over the target area, repetitive acoustic transmissions take place and a plurality of receiver beams are formed for obtaining a side looking sonar picture of the target area. For greater coverage, the system will generally employ both starboard beams 16 and port beams 16'. The receiver beam signals indicative of the target area are transmitted via a cable 18 to display equipment on the towing vehicle 14.

Figure 2A:
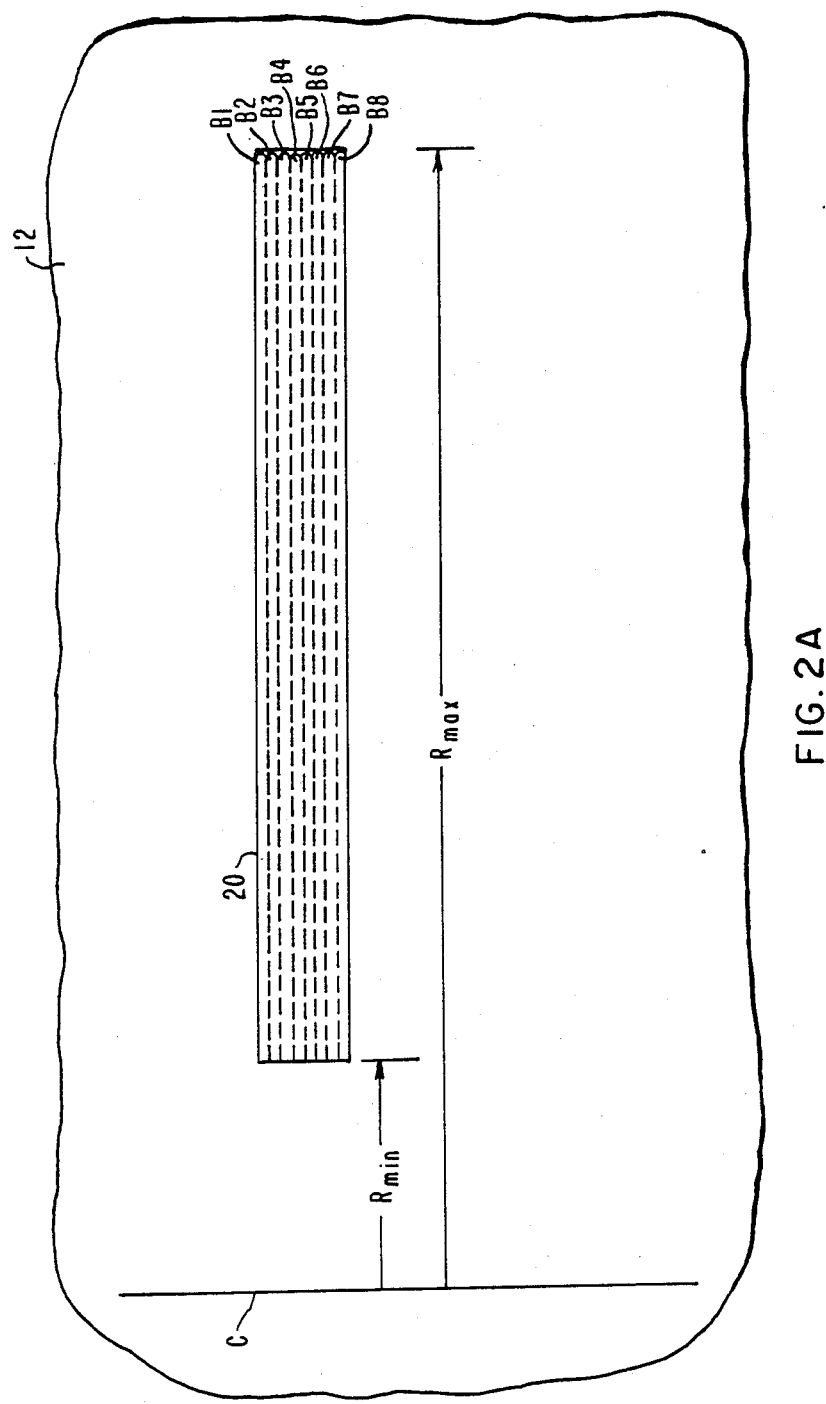
FIGS. 2A and 2B illustrate the receiver beams of the side looking sonar system superimposed upon an insonified region of the target area.

FIG. 2A illustrates a plan view of the target area and shows a rectangular insonified zone 20 which extends from some minimum range $R_{min}$ out to some maximum range $R_{max}$. Superimposed upon the insonified zone 20 are relatively narrow adjacent receiver beams B1 to B8, each for obtaining acoustic information relative to a respective narrow strip on the target area for subsequent display.

During actual operation over the target area, the carrier vehicle may be subject to a limited oscillatory rotational movement or variation in speed. In order to compensate for undesirable yaw rates and speed variations, the insonified area is made wider at maximum range than it is at minimum range, such insonified area being designated by the numeral 21 in FIG. 2B and having superimposed thereon the receiver beams B1 to B8.

Figure 2B:
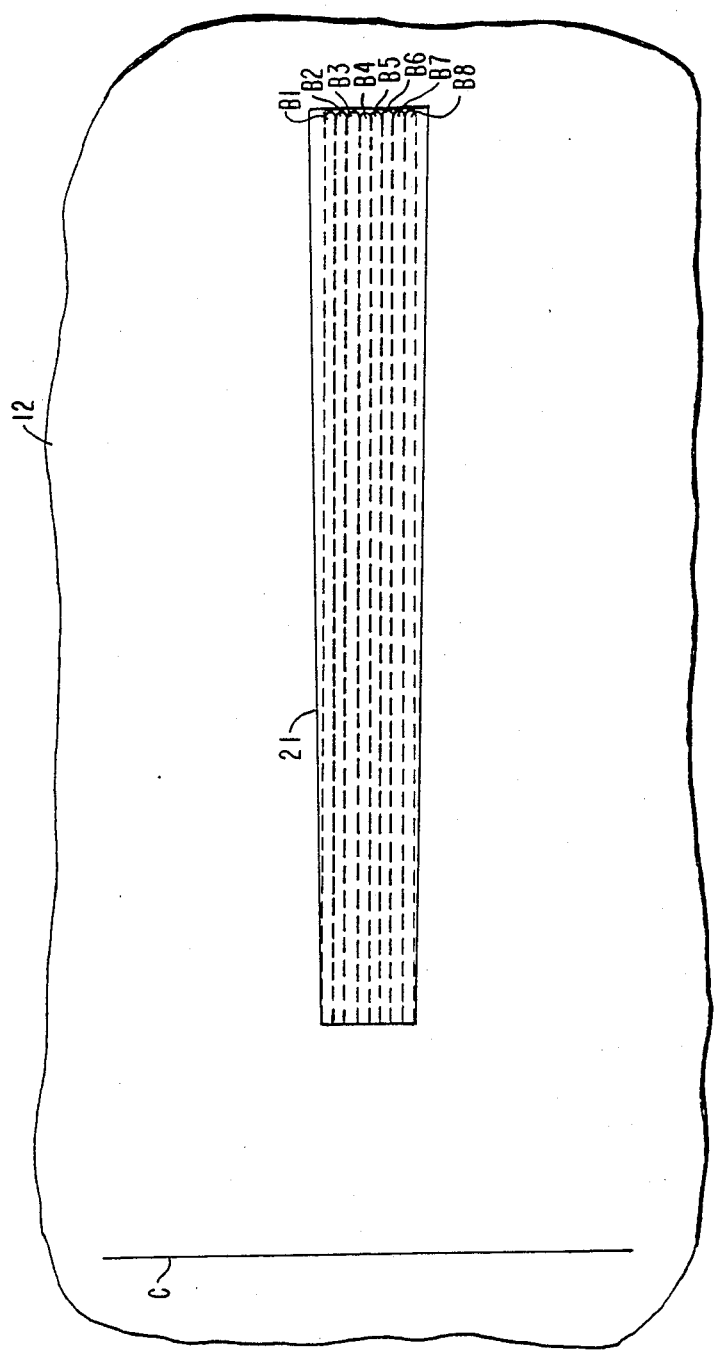
Figure 3:
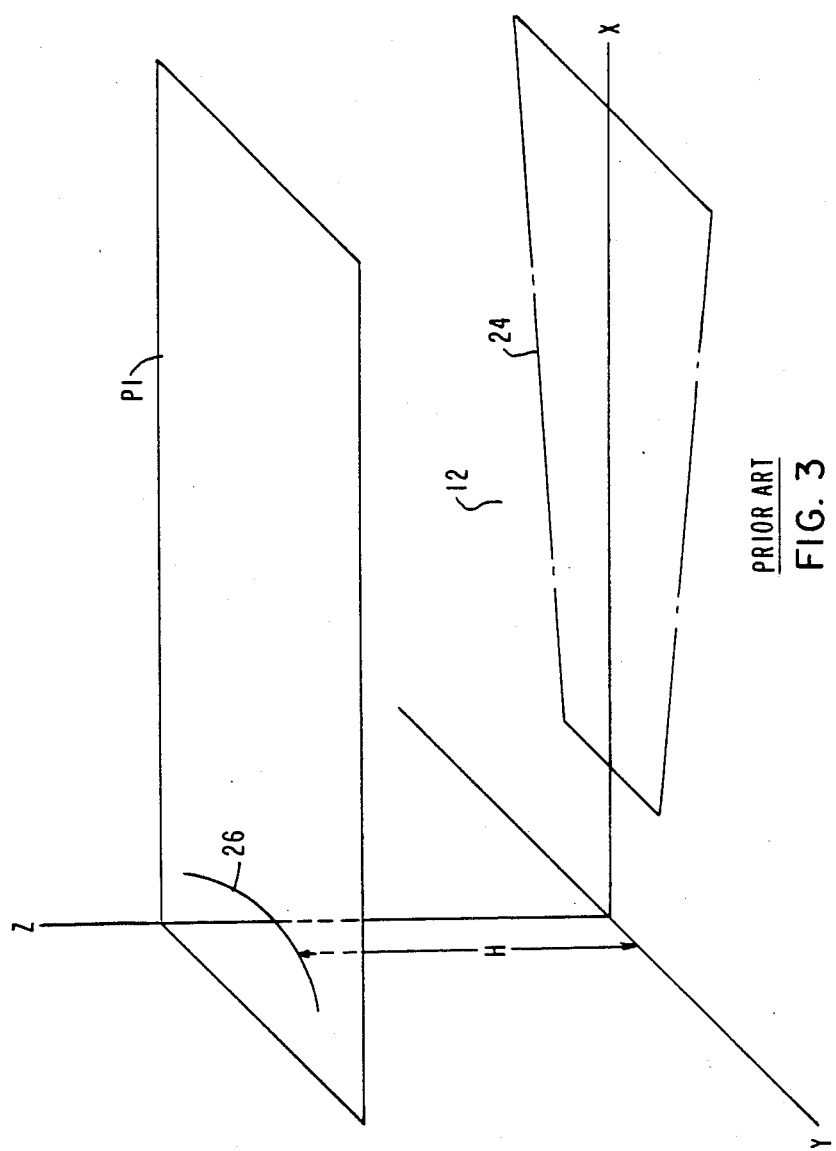
FIG. 3 is an XYZ coordinate system serving to illustrate the orientation of the transmitter transducer for the apparatus of FIG. 1.

FIG. 3 illustrates one method by which the trapezoidal insonified zone of FIG. 2B may be produced. Insonified zone 24 lies along the X axis in the XY place representing the target area 12. The transmitter transducer lies along an arc 26 on the Z axis at an altitude H above the XY plane. Arc 26 is an arc of a circle which lies in the plane P1 shown in FIG. 3 to be parallel to the XY plane. In actual practice, the transmitter transducer which lies along arc 26 is made up of a plurality of adjacent elongated active transducer elements such as barium titanite or lead zirconate titanite with each element being given a certain depression angle. When supplied with an energizing signal, the transmitter transducer projects acoustic energy from the convex side of the arc and insonifies the trapezoidal area 24. FIG. 3 represents an orientation which is currently in use, and a variation in which the plane P1 itself is given a certain depression angle with respect to horizontal is illustrated in application Ser. No. 932,584, now abandoned.

The insonification pattern illustrated in FIG. 2B and generated by the apparatus of FIG. 3 is sufficient for a good resolution 8 beam system. There has been developed however an extremely high resolution system which travels at slower speeds and forms fewer, for example 3, extremely narrow high resolution receiver beams.

Figure 4:
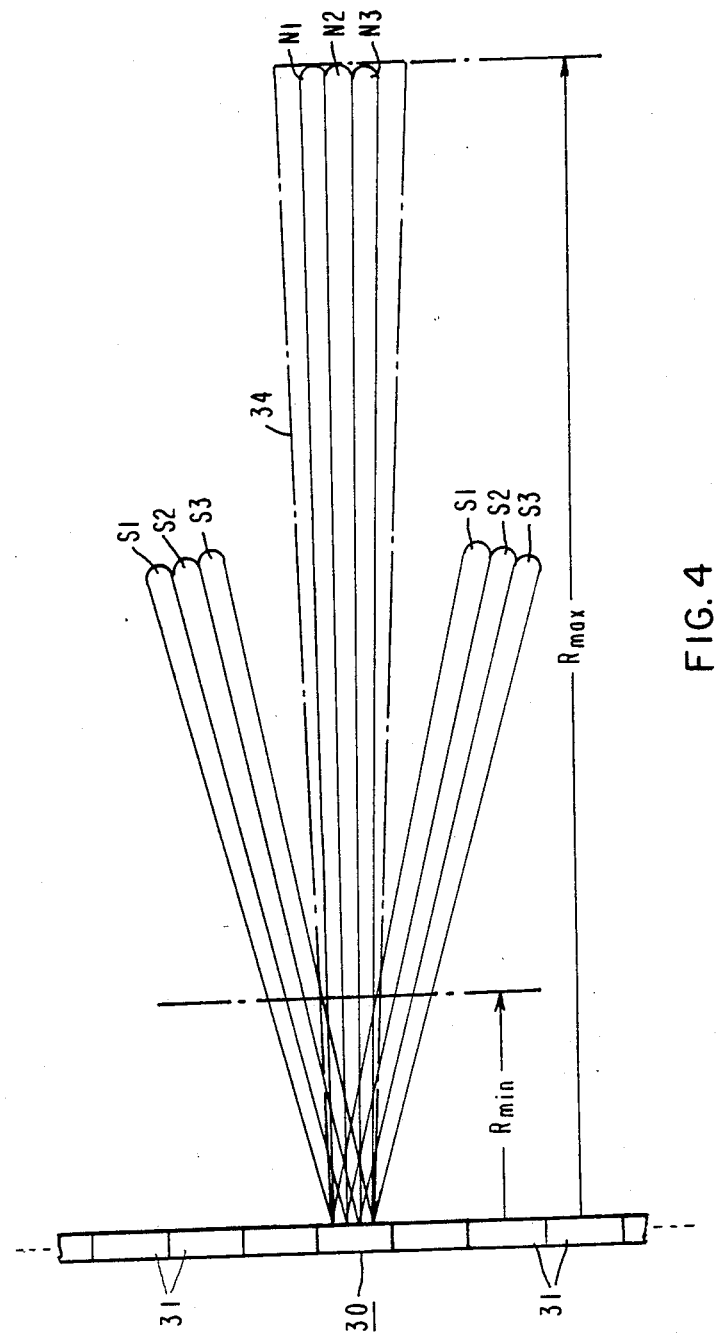
FIG. 4 illustrates the receiver beams formed for a high resolution, fewer beam, side looking sonar system.

FIG. 4 illustrates the three beams N1, N2 and N3 of such system. FIG. 4 additionally illustrates a straight line receiver transducer 30, such transducer commonly being made up of a plurality of adjacent elongated active elements 31 each being operable to provide a respective output signal upon the receipt of reflected acoustic energy from the insonified area. The output signals generated by the active elements are provided to signal processing apparatus (not shown) which forms the multiple beams and an example of which is illustrated in U.S. Pat. No. 3,950,723 hereby incorporated by reference.

The signal processing for forming beams N1 to N3 involves the phase shifting of the individual output signals of th transducer elements 31. In view of the fact that these elements have a finite length, the signal processing, in addition, to generating the desired receiver beams, also generates grating side lobes for each beam, these side lobes being respectively designated as S1 to S3. The desired insonification pattern on the target area is designated by the numeral 34 and it is seen that the pattern is of such configuration as to generally exclude as much as possible, the side lobes, from minimum range to maximum range, so that any target returns will be received on beams N1 to N3. If the apparatus of FIG. 3 were used to produce the insonified zone, the pattern 34 would be much wider so as to encompass the side lobes thereby subjecting the apparatus to potentionally false target direction information. One potential solution for obtaining the narrower insonification zone is to decrease the length of the transmitter transducer. In order to get the desired acoustic intensity and maximum range, a certain amount of power must be supplied to the transmitting transducer. If the length of the transducer is decreased in order to reduce the size of the insonified zone, the tota power applied to the decreased length transducer may be sufficient to crack and destroy individual transducer elements.

Figure 5:
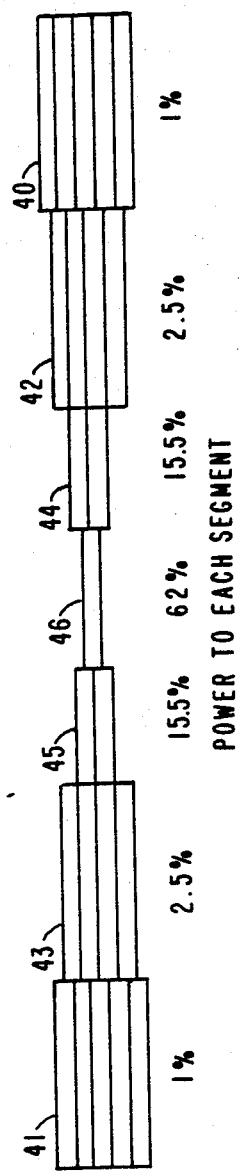
FIG. 5 illustrates one type of prior art transmitter transducer.

In order to better distribute the power to shape the insonified area, another prior art projector has been developed and is illustrated in FIG. 5. FIG. 5 is a front view of the transducer and it is seen to be composed of a plurality of segments, with the end segments 40, 41 each being comprised of 5 stacked active transducer elements, the next sections 42, 43 being comprised of 4 stacked elements, the next section 44, 45 being comprised of two stacked elements and a center section 46 being comprised o a single element. The transducer is shaded, that is different powers are supplied to different sections, as illustrated. Although this transducer is an improvement over the shorter arc transducer, under certain operating conditions the insonified area was not as uniform as desired and the center element 46 was still prone to cracking.

Figure 6:
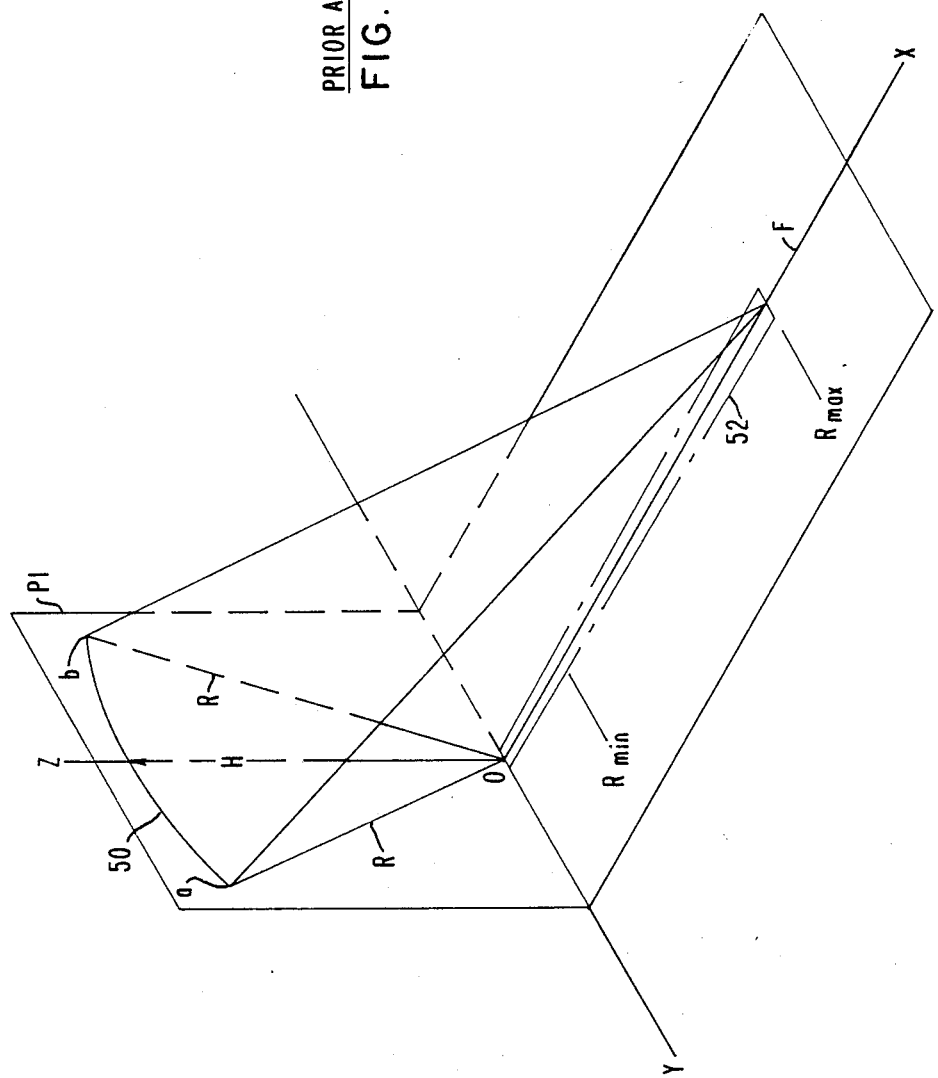
FIG. 6 is an XYZ coordinate system illustrating the principles of a focused side looking sonar arc transducer of the prior art.

FIG. 6 is presented to illustrate the principles of a focused arc transducer. An XYZ coordinate system is illustrated with the XY plane containing the target area to be insonified. Arc 50 extending between points a and b represents a curved transducer which lies in vertical plane Pl at a distance or altitude H from origin O. The curved transducer lies on a section of a circle having as its center the point O with a radius equal to R, and accordingly each point on the arc 50 is at the same distance R from point O. Line F, coincident with the X axis, is known as the line of focus and is perpendicular to the plane of the circle at point O and at any point on line F is equidistant to all points on the arc 50.

In actual practice, the transmitter transducer may be comprised of a plurality of active transducer elements, the active faces of which lie along the arc 50 and when supplied with electrical energy to transmit, will insonify in theory, the line of focus out to some maximum range, but in actuality will insonify a small trapezoidal area 52 which may be wide enough for a single beam system but not for a multi-beam system such as illustrated in FIG. 4.

Figure 7:
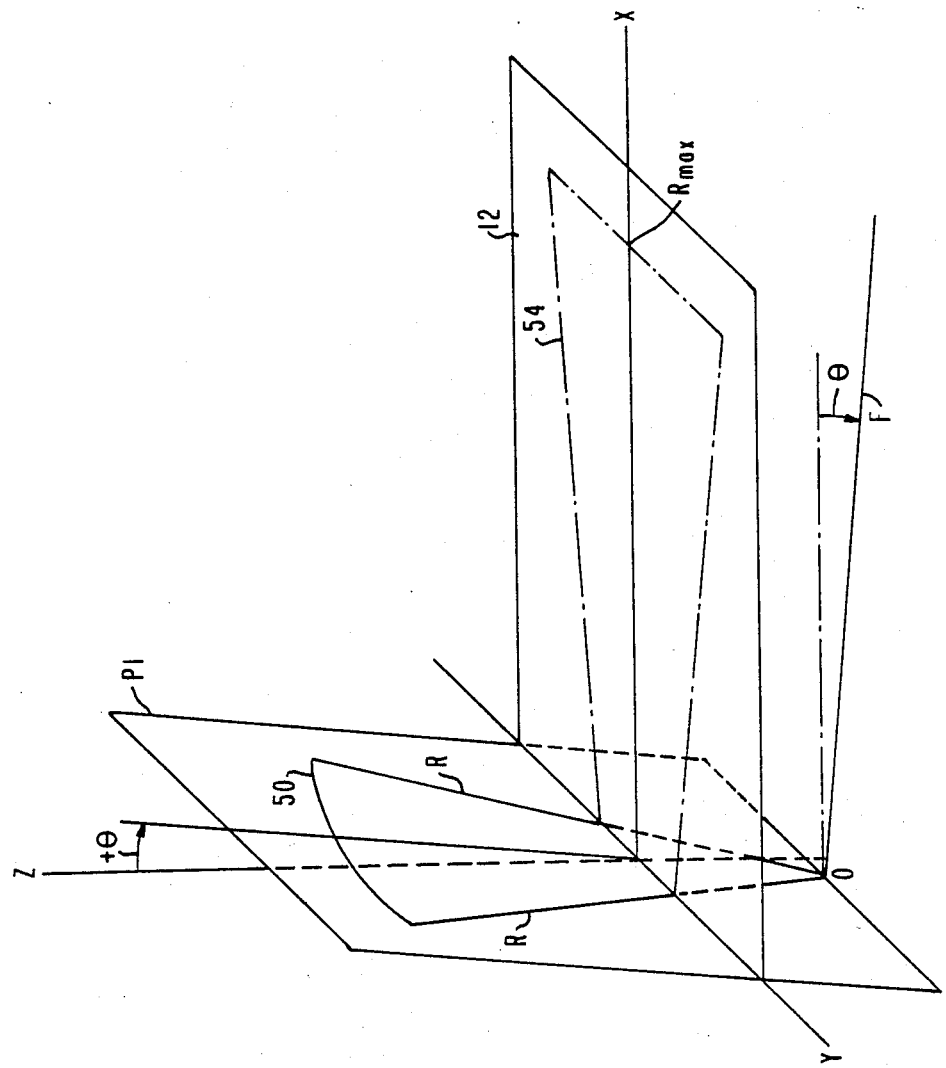
FIG. 7 illustrates, in an XYZ coordinate system, the orientation of an arc transducer in accordance with one embodiment of the present invention.

FIG. 7, illustrating one embodiment of the present invention, is a modification of the arrangement of FIG. 6 in order to provide for a larger insonified area of sufficient size to accommodate the three beam system of FIG. 4 but being of a limited size so as to exclude false target information which may be picked up by the generated side lobes. FIG. 7 illustrates the same arc transducer 50 as in FIG. 6, however, with a modified orientation. More particularly, considering the XY plane as the target area 12, the arc 50 is decreased in altitude such that H<R and the origin O and line of focus F fall below the XY plane. In addition, the plane P1 containing arc 50 is tilted forward slightly by an angle $+\theta$ where $\theta$ is in the order of one degree but no more than six degrees. With this orientation, there is provided a trapezoidal insonification zone 54 which meets the desired design requirements.

In general, for a particular design altitude H, the radius of curvature R of arc 50 can be determined from the following equation.

$$R = \frac{H}{1 - \frac{Nr}{L}} \quad (1)$$

where N is the number of receiver beams, r is the beam resolution and L is the transducer length. The angle $\theta$ by which the arc 50 is tilted toward the target area may be determined as follows:

$$\theta = \frac{x(R-H)}{B\,R_{max}} \text{ radians} \quad (2)$$

where $\theta$ is in radians, is the number of beam widths at minimum range and x is the additional beam widths at maximum range.

Figure 7A:
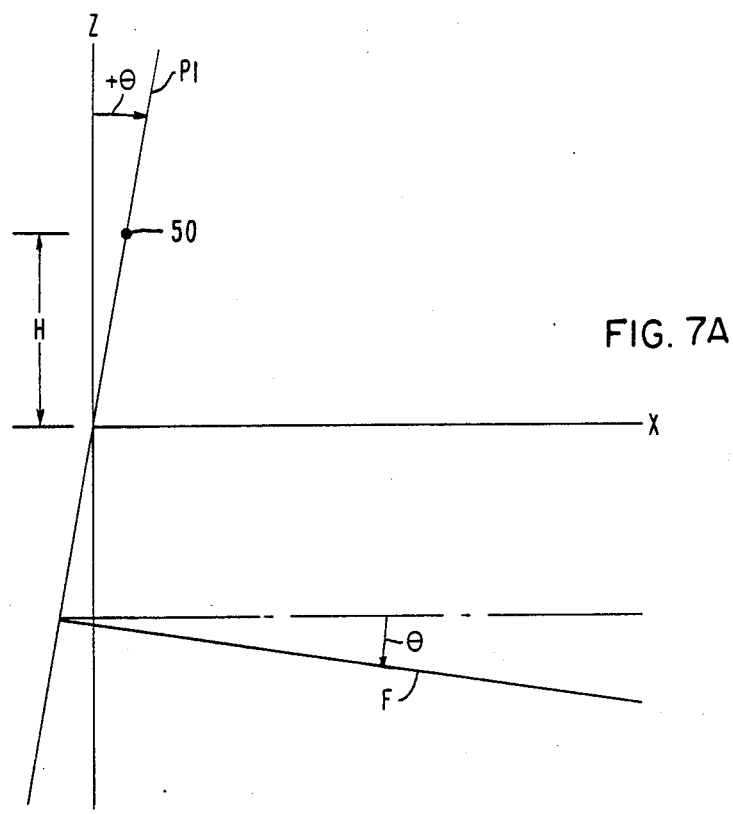
FIG. 7A is a view of 7 looking in along the Y axis.
Figure 7B:
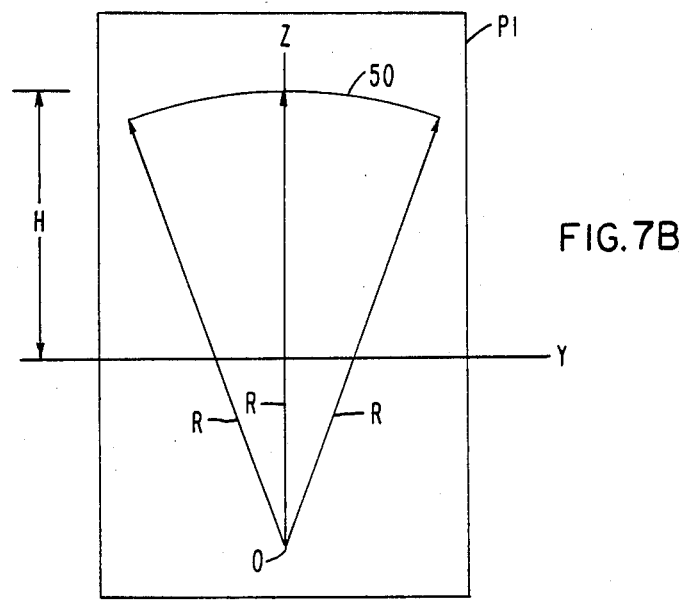
FIG. 7B is a view of FIG. 7 looking in along the X axis.

FIG. 7A is a view of FIG. 7 looking in at the Y axis and illustrates the plane P1 at the angle $\theta$ which is the same angle by which the line of focus F is depressed from horizontal. FIG. 7B is a view of FIG. 7 looking in along the X axis and further illustrates the relationship between altitude H and radius of curvature R, with the origin O being below the XY plane.

Figure 8B:
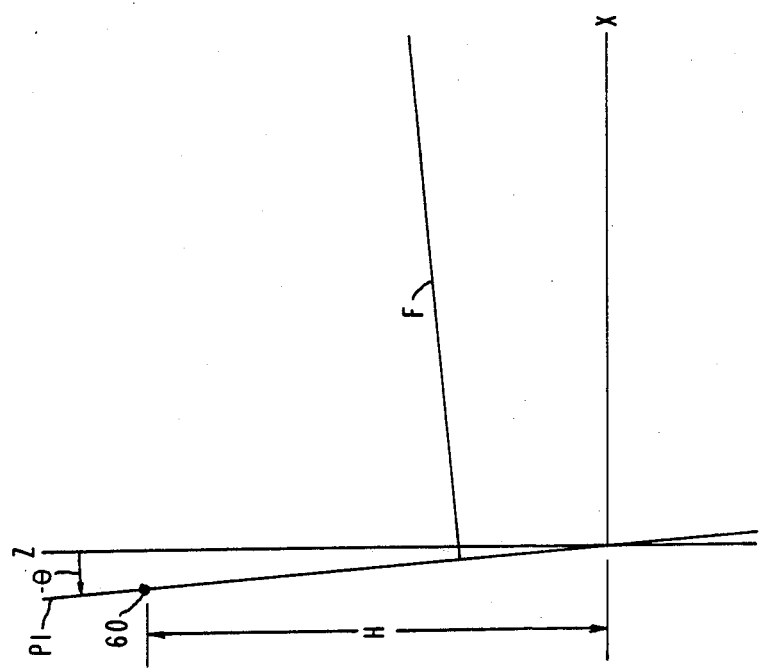
FIGS. 8A and 8B are respective X axis and Y axis views of an XYZ coordinate system illustrating another embodiment of the present invention.
Figure 8A:
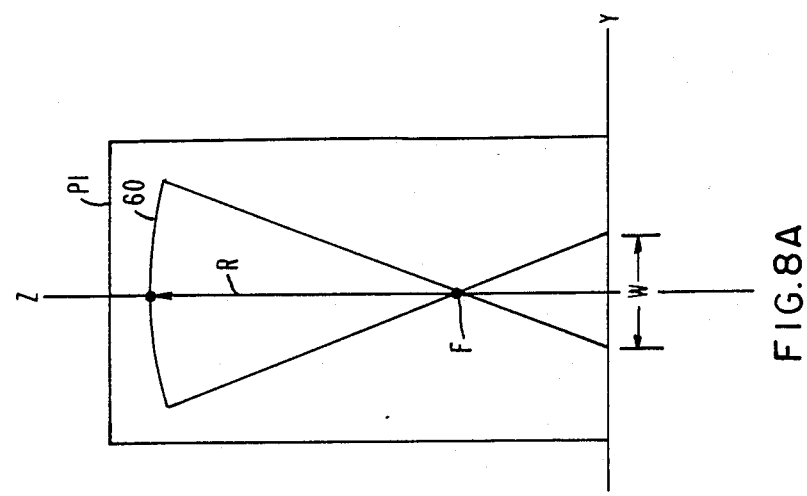

Some high resolution systems, such as described in FIG. 4, are capable of performance in two modes of operation, one mode being a full range mode, and the other, a half range mode wherein the apparatus lies closer to the bottom and doesn't need as much pattern width. FIGS. 8A, 8B and 9A, 9B illustrate other embodiments of the present invention to accommodate for full and half range modes of operation. FIG. 8A is a view of an XYZ coordinate system looking in along the X axis toward the YZ plane, and FIG. 8B is a view looking in along the Y axis. Arc 60 is in the P1 plane and has a radius of curvature R such that the focal line F falls above the XY plane. Plane P1 is tilted not toward, but away from the target area (the XY plane) by an angle $-\theta$ where $\theta$ is preferably in the order of one degree but no more than six degrees. As viewed in FIG. 8A, the width of the insonified area at the YZ plane would be W and this width would progressively increase out to maximum range to define a trapezoidal insonified area.

Figure 9B:
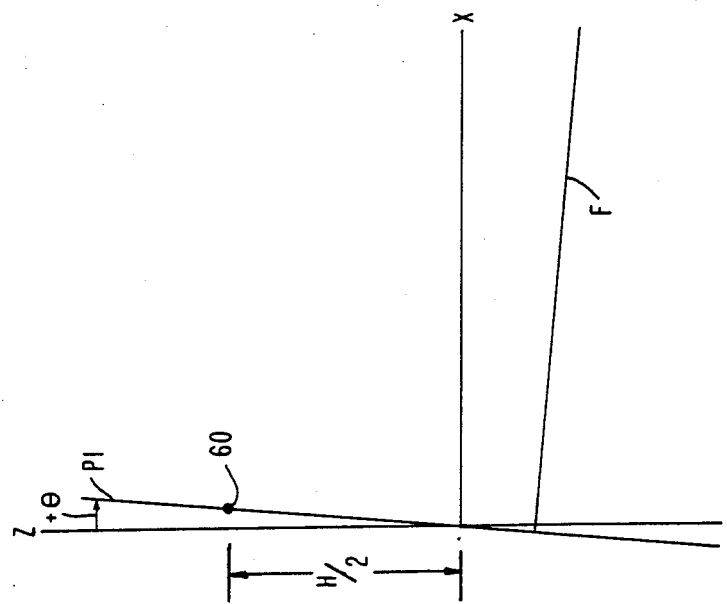
FIGS. 9A and 9B are respective X axis and Y axis views of an XYZ coordinate system illustrating another embodiment of the present invention.
Figure 9A:
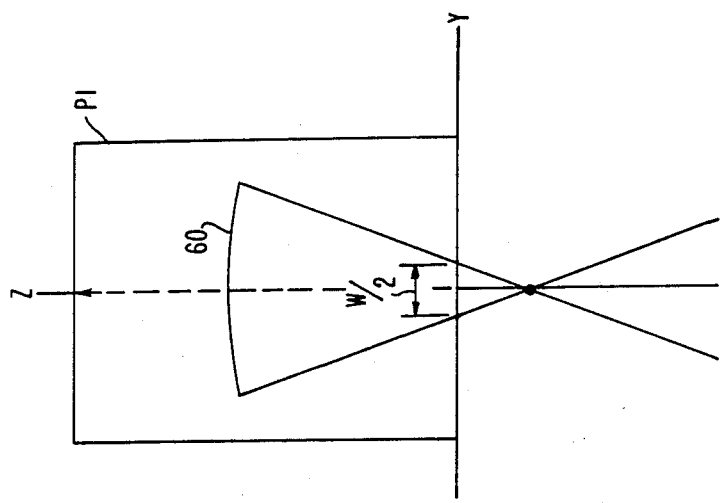

In the half range mode where the width at the YZ plane is to be less than W, for example W/2, and the altitude is, for example H/2, then the arrangement of FIGS. 9A and 9B may be utilized. In this latter arrangement, plane P1 containing the arc 60 is tilted toward the target area by the angle $+\theta$ and the line of focus F falls below the XY plane. As illustrated in FIG. 9A, the initial width of the insonified area for the dimensions illustrated will be the desired width W/2.

Figure 10:
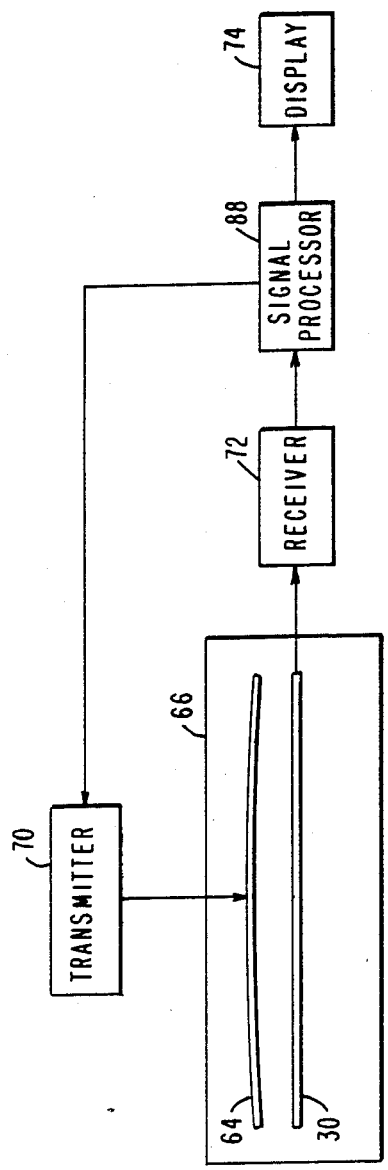
FIG. 10 is a simplified block diagram of a said looking sonar transducer system utilized in conjunction with the embodiment of the invention illustrated in FIG. 7.

FIG. 10 illustrates the apparatus for performing the embodiment of FIG. 7. In FIG. 10, numeral 30 represents the receiving transducer and numeral 64 represents a transmitting transducer which lies along the arc of a circle as previously described with respect to FIG. 7. Both transducers may be contained in a single housing 66 and signal processing apparatus 88 may be operable to provide an initiating signal to transmitter 70 to cause a energization of the transmitting transducer 64 and the projection of acoustic energy to insonify the desired area. Thereafter, acoustic returns impinge upon receiving transducer 30, and receiver apparatus 72 in conjunction with signal processing apparatus 88 form multiple receiver beams to examine extremely narrow areas of the insonified zone with the results of such analysis being provided to display 74. The transmissions take place periodically during travel over the target area so that a picture of the entire area of interest may be displayed and recorded.

Figure 11:
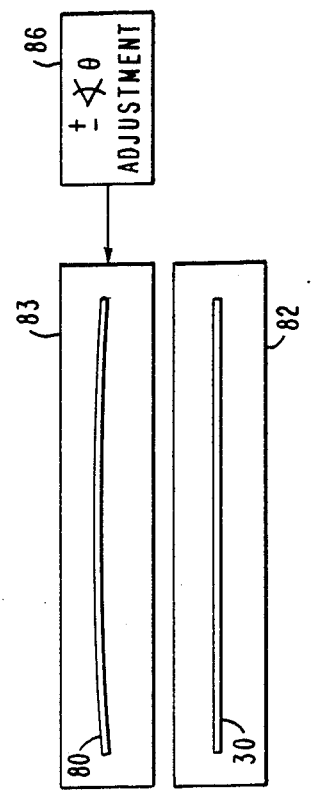
FIG. 11 illustrates a modification of the apparatus for practicing the embodiments of FIGS. 8B and 9B.

The arrangement of FIG. 11 would employ the same signal processing and display apparatus as in FIG. 10 however, the transducer housing may be separated such that receiver transducer 30 is contained in a housing 82 and transmitting transducer 80 is contained in a housing 83 which may be rotatable about a horizontal axis by means of adjustment mechanism 86 so as to vary the angle $\theta$ so as to be able to practice the full range and half range modes of operation as described with respect to 8A, 8B and 9A, 9B.

What is claimed is:

1. Side looking sonar apparatus for operation over a target area, comprising:
   (A) an elongated transmitter transducer which lies along an arc of a circle having a radius R;
   (B) said arc lying in a plane which is at angle $\theta$ with respect to vertical during operation, where $0° < |\theta| \leq 6°$;
   (C) said transmitter transducer being at an altitude H above said target area, where $H \neq R$; and
   (D) means for energizing said transmitter transducer to periodically project acoustic energy toward said target area.

2. Apparatus according to claim 1 wherein:
   (A) $H < R$ and $\theta$ is positive.

3. Apparatus according to claim 1 wherein:
   (A) $H < R$ and $\theta$ is negative.

4. Apparatus according to claim 1 which includes:
   (A) a housing;
   (B) said transmitter transducer being contained within said housing;
   (C) said housing being rotatable about a horizontal axis so as to selectably vary said angle $\theta$.

5. Side looking sonar apparatus for operation over a target area, comprising:
   (A) a transmitter transducer;
   (B) a receiver transducer;
   (C) signal processing means connected to said receiver transducer for forming three high resolution receiver beams for receiving acoustic returns from a relatively narrow trapezoidal shaped insonified strip on said target area;
   (D) said transmitter transducer being operable to insonify said strip;
   (E) said transmitter transducer lying along an arc of a circle of radius R and lying in a plane which is at an angle $\theta$ with respect to vertical during operation of said apparatus, where $0° < \theta \leq 6°$.

6. Side looking sonar apparatus for operation over a target area, comprising:
   (A) a transmitter transducer lying along an arc of a circle and being operable to project acoustic energy toward a line of focus which is perpendicular to the plane in which said circle lies;
   (B) said transmitter transducer being at an altitude above said target area such that said line of focus is positioned below the plane of said target area;
   (C) said plane in which said circle lies being tilted toward said target area at an angle $\theta$ with respect to vertical, where $0° < \theta \leq 6°$.

7. Side looking sonar apparatus for operation over a target area, comprising:
   (A) a transmitter transducer lying along an arc of a circle and being operable to project acoustic energy toward a line of focus which is perpendicular to the plane in which said circle lies;
   (B) said transmitter transducer being at an altitude H above said target area such that said line of focus is positioned above the plane of said target area;
   (C) said plane in which said circle lies being tilted away from said target area at an angle $\theta$ with respect to vertical $0° < \theta \leq 6°$.

* * * * *